(12) United States Patent
Parker

(10) Patent No.: US 8,856,220 B2
(45) Date of Patent: Oct. 7, 2014

(54) SHARED ANALYTICS AND FORECASTING SYSTEM

(71) Applicant: Verizon Patent and Licensing Inc., Basking Ridge, NJ (US)

(72) Inventor: Benjamin J. Parker, Foster City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 127 days.

(21) Appl. No.: 13/648,402

(22) Filed: Oct. 10, 2012

(65) Prior Publication Data

US 2014/0101229 A1  Apr. 10, 2014

(51) Int. Cl.
*G06F 15/16* (2006.01)

(52) U.S. Cl.
USPC .......................... 709/203; 709/219; 705/7.31

(58) Field of Classification Search
USPC .................. 709/203, 200, 217, 219; 705/7.31
See application file for complete search history.

(56) References Cited

U.S. PATENT DOCUMENTS

| | | | |
|---|---|---|---|
| 7,797,182 B2 * | 9/2010 | Lindquist et al. | 705/7.31 |
| 7,881,961 B2 * | 2/2011 | Ricketts | 705/7.12 |
| 8,051,000 B2 * | 11/2011 | Kurczek et al. | 705/37 |
| 8,346,921 B1 * | 1/2013 | Goodspeed et al. | 709/224 |
| 8,499,066 B1 * | 7/2013 | Zhang et al. | 709/223 |
| 8,566,788 B2 * | 10/2013 | Snodgrass et al. | 717/109 |
| 2013/0046635 A1 * | 2/2013 | Grigg et al. | 705/14.58 |

* cited by examiner

*Primary Examiner* — El Hadji Sall

(57) ABSTRACT

A first server may receive first sets of data from multiple second servers and may receive a query from a client device. The query may include an identifier associated with one of the one or more second servers, a timeframe, and a request for forecast information relating to the timeframe and relating to a first set of data received from the one of the one or more second servers. The first server may determine a second set of data associated with the one of the one or more second servers associated with the identifier. The first server may also determine subsets of the first sets of data that relates to the historical data for the timeframe; determine the forecast information based on the subsets of the first sets of data and the second set of data; and provide, to the client device, a query response including the forecast information.

20 Claims, 6 Drawing Sheets

US 8,856,220 B2

SHARED ANALYTICS AND FORECASTING SYSTEM

BACKGROUND

Forecasting analysis is sometimes performed to forecast some data, such as sales data, traffic data, manufacturing data, etc. Forecasting analysis is sometimes inaccurate and incomplete since many factors may be considered when performing the forecasting analysis.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide an analytics and forecasting system that may be shared among multiple parties (e.g., service providers, product merchants, enterprises, etc.). In some implementations, the systems and/or methods may provide information to forecast product sales, staffing requirements, traffic flow (e.g., road traffic, web traffic, cellular network traffic), etc. based on correlating analytics data (e.g., historical sales data, historical traffic data, etc.) with data relating to some event (e.g., an anticipated launch of a product, a conference, a sporting event, etc.) and/or with data shared among multiple parties and provided by the multiple parties (e.g., search queries, product manufacturing data, product sales data, etc.).

For example, the analytics system may forecast projected sales activity for a first party (e.g., a merchant) by correlating historical sales activity information, provided by the merchant, with event data identifying the market launch of a product that the merchant may sell and with data provided by a second party (e.g., a manufacturer of the product that the merchant may sell).

In some implementations, the systems and/or methods may allow the first party and the second party to each provide respective sets of data for independent purposes, while providing forecasting information for the first party based on data provided by the second party.

Figure 1:
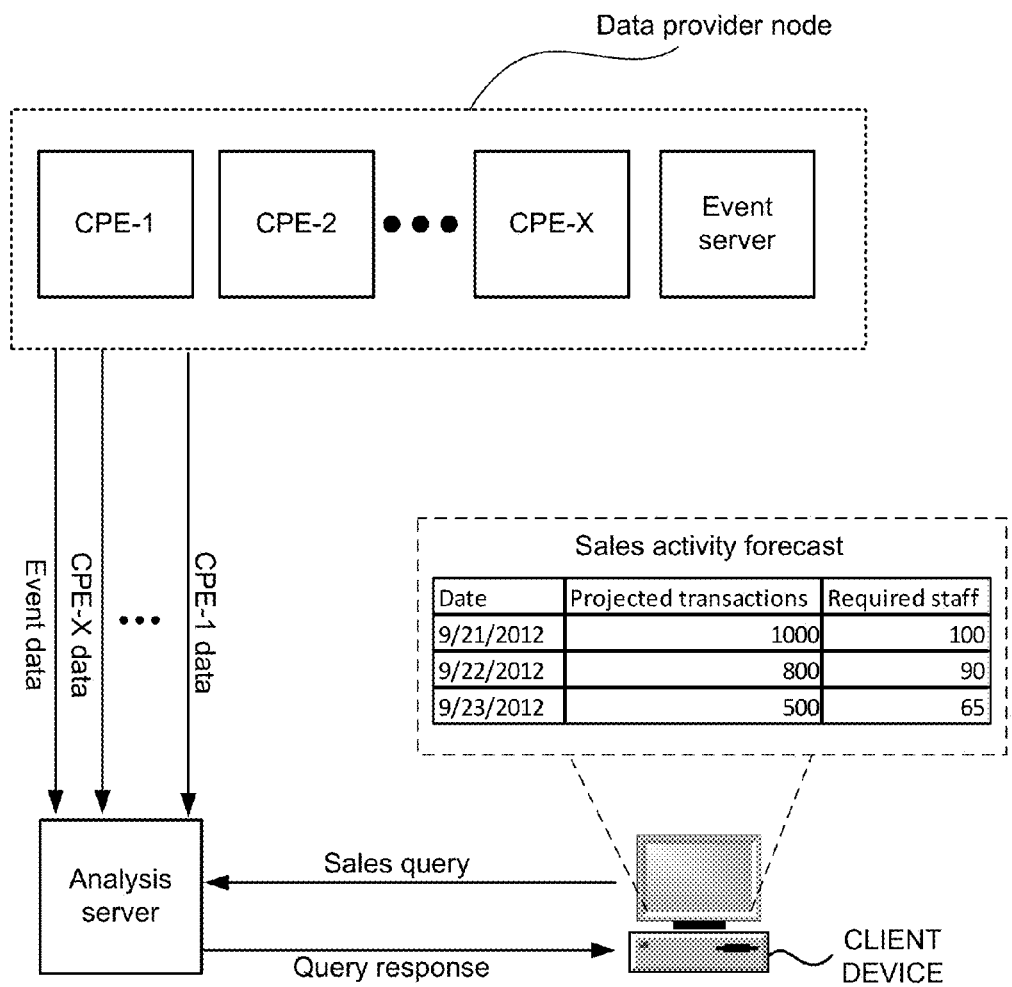
FIG. 1 illustrates an example overview of an implementation described herein.

FIG. 1 illustrates an example overview of an implementation described herein. As shown in FIG. 1, a data provider node may include one or more customer premise equipment (CPE) devices (e.g., CPE-1 through CPE-X (where X≥1)), where each CPE may be associated with a different party and each CPE may store data associated with their respective parties. The data provider node may also include an event server to store information regarding events (e.g., sporting events, public events, etc.).

In FIG. 1, assume that CPE-1 is associated with a merchant (e.g., a merchant of cellular phones) and that CPE-1 generates and/or stores data (e.g., sales activity data) for determining sales forecast information for the merchant. In some implementations, the data provider node may include any number of CPEs to generate and/or store data associated with some other party. For example, CPE-2 may be associated with a manufacturer and may generate and/or store data associated with the manufacturer (e.g., manufacturing production quantity, part numbers, shipping information for product shipments, etc.).

In some implementations the data provider node may provide data generated by CPE-1 through CPE-X and event data generated by the event server to an analysis server. As shown in FIG. 1, a client device may provide a forecast query (e.g., a sales query) to the analysis server to receive information regarding sales activity forecast, associated with the merchant, for a specified timeframe (e.g., an upcoming weekend). In some implementations, the client device may provide the forecast query via a web-based user interface of the client device or some other user interface. The analysis server may generate analytics data based on the timeframe included in the query (e.g., Sep. 21, 2012-Sep. 23, 2012). For example, the analytics data may correspond to historical sales activity, associated with the sales activity for the merchant, on particular days of the week (e.g., Fridays, Saturdays, and Sundays) associated with the timeframe included in the query.

In some implementations, the analysis server may determine correlating data that may affect the sales activity for the merchant during the timeframe included in the query. For example, the analysis server may parse data provided by the event server (e.g., news articles, web pages, data feeds, blogs, social networks, and/or other event information sources) to identify an event relating to the launch of a new cellular phone model that the merchant sells (e.g., by searching for terms, in information from the event sources, relating to the launch of the new cellular phone model, and/or by determining the popularity of the event sources relating to the launch of the new cellular phone model).

Additionally, the analysis server may parse data provided by CPE-1 through CPE-X (e.g., manufacturing data of the new cellular phone model) to determine correlating data. In some implementations, the analysis server may determine a factor relating to how the correlating data may affect historical sales. For example, the analysis server may determine a factor of five (or some other factor) to indicate that the correlating data may increase sales activity by a factor of five during a specified timeframe.

In some implementations, the analysis server may generate a query response including information to identify sales activity forecast for the timeframe included in the sales query based on historical sales activity and based on a factor associated with an event that may affect the sales activity. As shown in FIG. 1, the client device may receive the query response and may display information regarding the sales activity forecast (e.g., projected transactions, required staff, and/or some other information regarding the sales activity forecast).

In some implementations, the analysis server may include multiple analysis nodes where each analysis node may be associated with a particular CPE. Further, analysis nodes may connect to each other such that data provided by multiple CPEs may be used as correlating data when generating a query response. As an example, assume that a first CPE is associated with a first analysis node of the analysis server and that second a second CPE is associated with a second analysis node of the analysis server. In some implementations, the second analysis node may be connected to the first analysis node such that data provided by the first CPE may be used as correlating data associated with data provided by the second CPE.

As a result, forecasting information may be determined based on event information and based on information provided by multiple CPEs associated with multiple parties, even when the multiple parties are independent of each other and when each CPE generates and/or stores data for different purposes. Further, correlating and forecasting algorithms may be shared among the multiple parties via connected analysis nodes of the analysis server.

While a particular example of the systems and/or methods is described in FIG. 1, it will be apparent that the above description is merely an example implementation and in practice, the systems and/or methods may apply to different applications than what is shown in FIG. 1. For example, the systems and/or methods may apply to forecasting sales activity for a merchant selling household furniture or some other product. Additionally, or alternatively, systems and/or methods may apply to forecasting traffic (e.g., cellular network traffic, road traffic, etc.) based on correlating historical traffic data with event data associated with traffic data (e.g., sporting events, concert events, holidays, etc.). Additionally, or alternatively, systems and/or methods may apply to forecasting product shipment delivery data (e.g., traffic associated with product delivery routes) based on correlating historical product shipment delivery data with event data associated with product shipment delivery data (e.g., product launches, holidays, etc.).

Figure 2:
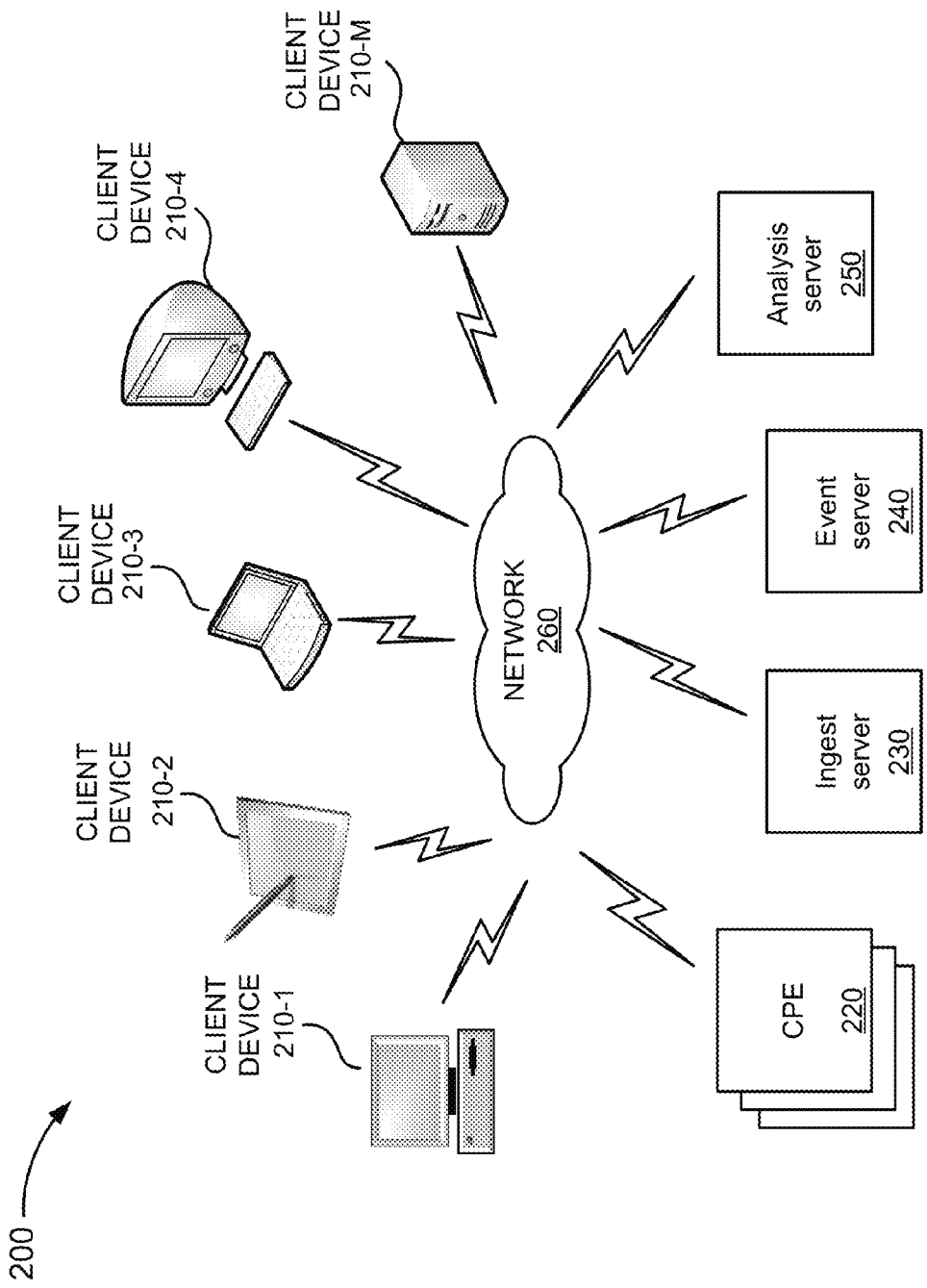
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1 through 210-M, where M≥1, CPEs 220, ingest server 230, event server 240, analysis server 250, and network 260.

Client device 210 may include any portable or non-portable device capable of communicating via a network, such as network 260. For example, client device 210 may correspond to a mobile communication device (e.g., a smart phone or a personal digital assistant (PDA)), a portable computer device (e.g., a laptop or a tablet computer), a non-portable computer device (e.g., a desktop computer, a server computer, etc.), or another type of computing device. In some implementations, client device 210 may communicate with analysis server 250 in order to receive forecasts (e.g., sales activity forecasts, traffic forecasts, staffing requirements forecasts, etc.) based on providing analysis server 250 with a forecast query.

CPE 220 may include a computing device, such as a server device, or a collection of server devices. In some implementations, environment 200 may include multiple CPEs 220, where each CPE 220 may be associated with a particular party (e.g., a product merchant, a service provider, a product shipping company, etc.). In some implementations, CPE 220 may generate and/or store data associated with a particular application of the particular party. (e.g., sales activity data for a product merchant, cellular traffic data for a cellular network provider, road traffic data for a product shipping provider, etc.) CPE 220 may communicate with ingest server 230 in order to provide the data to analysis server 250.

Ingest server 230 may include a computing device, such as a server device, or a collection of server devices. In some implementations, ingest server 230 may communicate with CPE 220 in order to receive data generated by CPE 220. In some implementations, a single CPE 220 may receive data generated by multiple CPEs 220. Additionally, ingest server 230 may provide the data to analysis server 250 (e.g., ingest server 230 may translate the data such that analysis server 250 may interpret the data).

Event server 240 may include a computing device, such as a server device, or a collection of server devices. In some implementations, event server 240 may store information regarding events (e.g., news articles, alerts, data feeds, blogs, etc.) and may provide the information regarding the events to analysis server 250. In some implementations, event server 240 may include software to communicate with event sources (e.g., servers providing event information or some other event source) in order to store the information regarding events.

Analysis server 250 may include a computing device, such as a server device, or a collection of server devices. In some implementations analysis server 250 may receive data from ingest server 230 and event data from event server 240. Additionally, analysis server 250 may receive a forecast query form client device 210 and may generate and/or provide a forecast response to client device 210. As described above, analysis server 250 may include multiple analysis nodes where each analysis node may be associated with a particular CPE 210.

Network 260 may include one or more wired and/or wireless networks. For example, network 260 may include a cellular network, a public land mobile network (PLMN), a second generation (2G) network, a third generation (3G) network, a fourth generation (4G) network, a fifth generation (5G) network, and/or another network. Additionally, or alternatively, network 260 may include a local area network (LAN), a wide area network (WAN), a metropolitan network (MAN), a telephone network (e.g., the Public Switched Telephone Network (PTSSN)), an ad hoc network, a managed IP network, a virtual private network (VPN), an intranet, the Internet, a fiber optic-based network, and/or combination of these or other types of networks.

In some implementations, client device 210, CPE 220, ingest server 230, event server 240, and analysis server 250 may communicate via network 260 using a hypertext transfer protocol (HTTP), an HTTP secure (HTTPS) protocol, and/or some other type of protocol.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
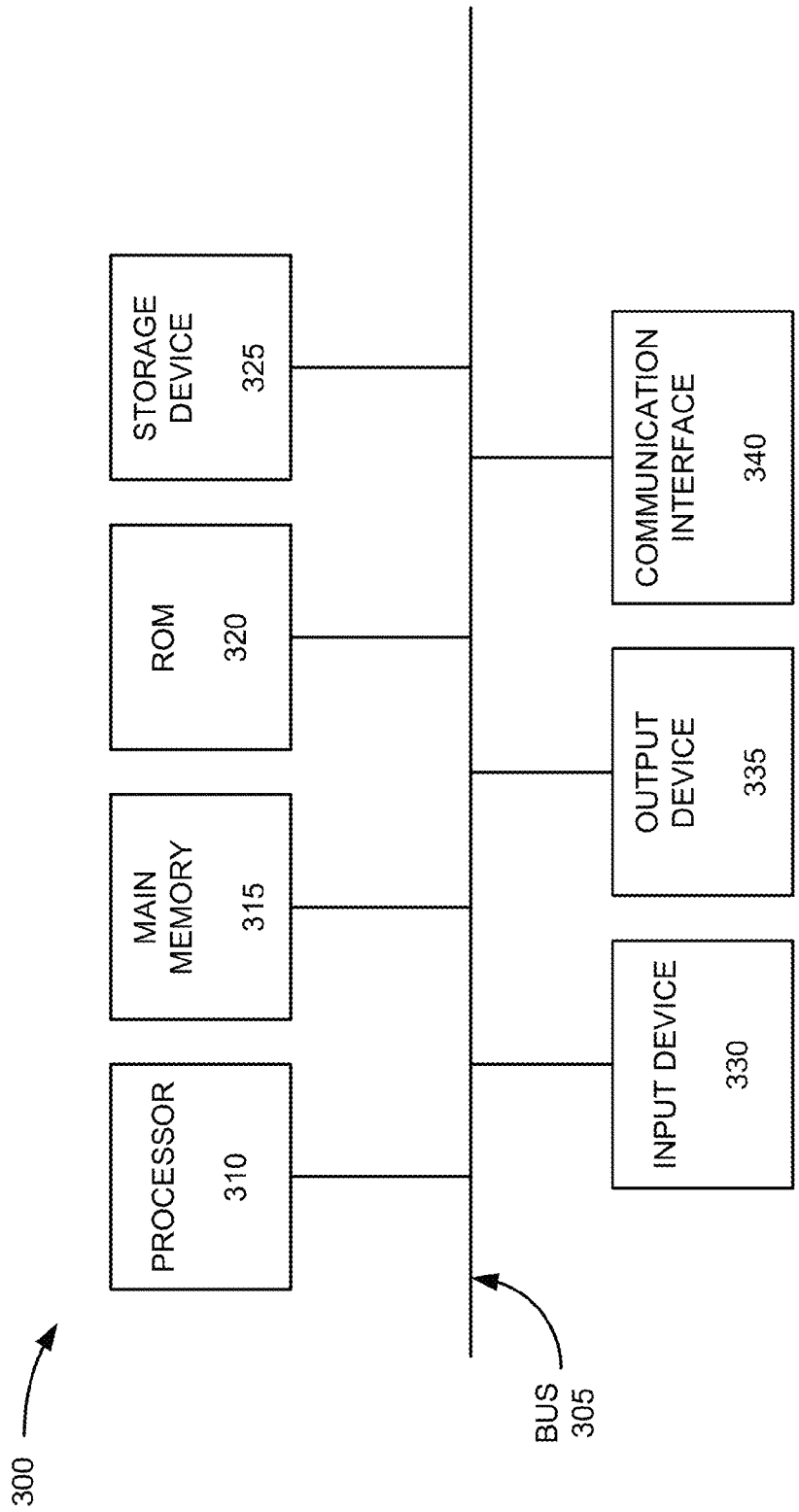
FIG. 3 illustrates example components of a device that may be used within the environment of FIG. 2.

FIG. 3 illustrates example components of a device 300 that may be used within environment 200 of FIG. 2. Device 300 may correspond to client device 210, CPE 220, ingest server 230, event server 240, and/or analysis server 250. Each of client device 210, CPE 220, ingest server 230, event server 240, and/or analysis server 250 may include one or more devices 300, and/or one or more components of device 300.

As shown in FIG. 3, device 300 may include a bus 305, a processor 310, a main memory 315, a read only memory (ROM) 320, a storage device 325, an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical storage device or spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
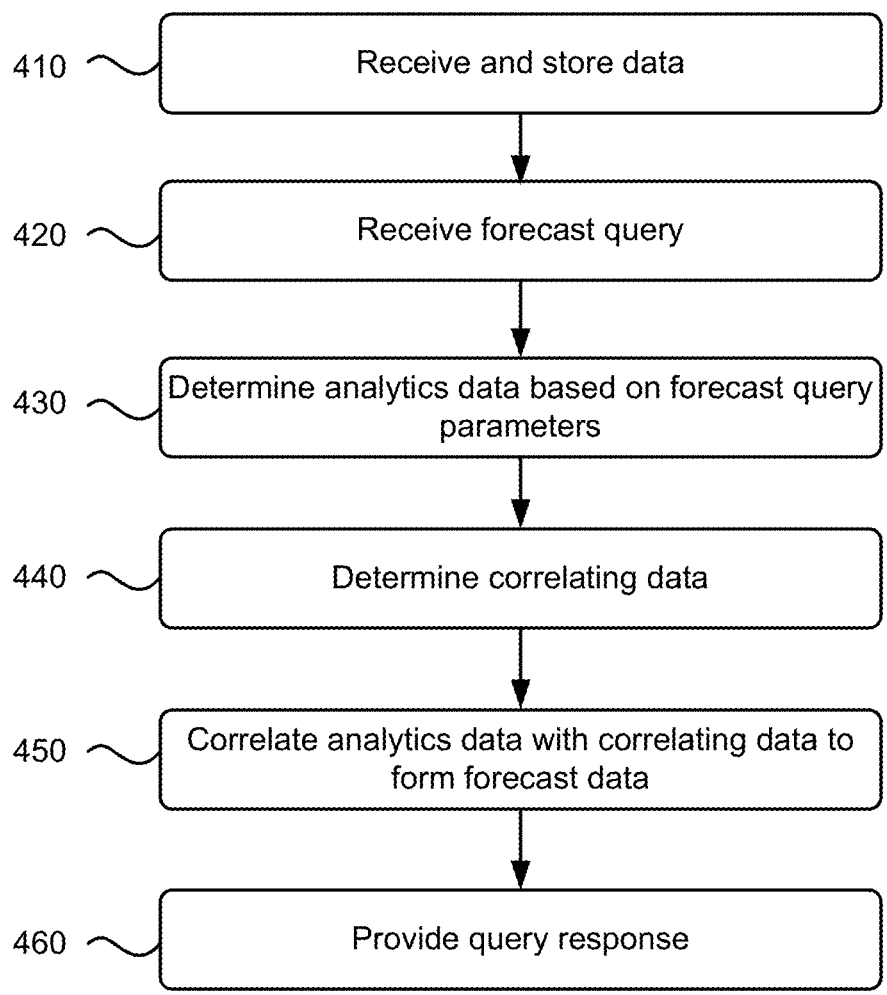
FIG. 4 illustrates a flowchart of an example process for correlating event data with analytics data.

FIG. 4 illustrates a flowchart of an example process 400 or correlating event data with analytics data. In some implementations, process 400 may be performed by one or more components of analysis server 250. In some other implementations, some or all of blocks of process 400 may be performed by one or more components of another device in environment 200 (e.g., CPE 220, ingest server 230, event server 240), or a group of devices including or excluding analysis server 250.

As shown in FIG. 4, process 400 may include receiving and storing data (block 410). For example, analysis server 250 may receive data from ingest server 230 related to a particular application for a particular party and may store the data based on receiving the data.

In one example implementations, analysis server 250 may receive data relating to sales activity data during a particular time period for a product merchant. For example, analysis server 250 may receive data (e.g., from a CPE 220 associated with the product merchant), such as a quantity of sales for a product, prices that the product sold for, a quantity of staff personal, a quantity of returns for the particular product, and/or some other data relating to sales activity for the product merchant.

In another example implementation, analysis server 250 may receive data relating to cellular traffic data during a particular time period for a cellular network service provider. For example, analysis server 250 may receive data (e.g., from a CPE 220 associated with the cellular network service provider), such as a quantity of cellular devices connected to a particular cellular base station, network outage data, network speed data, and/or some other data relating to cellular network traffic data.

In another example implementation, analysis server 250 may receive data relating to product shipping data during a particular time period for a product shipping company. For example, analysis server 250 may receive data (e.g., from a CPE 220 associated with the product shipping company), such as road traffic data corresponding to a particular geographic route associated with delivery routes associated with the product shipping company.

In another example implementation, analysis server 250 may receive data relating to events (e.g., from event server 240), such as sporting events, concert events, political events, public events, private events, etc. As described above, the data relating to the events may affect forecast information for a particular application (e.g., information regarding a sporting event may affect road traffic data associated with a particular geographic delivery route for a product shipping company).

Process 400 may also include receiving a forecast query (block 420). For example, analysis server 250 may receive a forecast query from client device 210. In some implementations, the forecast query may include parameters, such as an identifier for a particular party (e.g., a merchant) with which the forecast query is associated, a forecast timeframe, a geographic location, and a forecast type (e.g., a sales activity forecast).

Process 400 may also include determining analytics data based on the forecast query parameters (block 430). For example, assume that the forecast query includes an identifier that identifies a merchant, a timeframe associated with an upcoming weekend, and a sales activity forecast type. In some implementations, analysis server 250 may determine analytics data, such as historical sales data during the timeframe included in the forecast query (e.g., average sales data during a particular number of past weekends) for the merchant associated with the forecast query. As an example, assume that sales activity for the previous three weekends was 100 units sold, 200 units sold, and 150 units sold, respectively. Analysis server 250 may determine analytics data that identifies that, historically, an average of 150 units have been sold during the weekend timeframe.

Process 400 may further include determining correlating data (block 440). For example, analysis server 250 may determine correlating data, associated with the forecast query, based on receiving and storing data from CPEs 210 and event server 240 as described above with respect to block 410. In some implementations, data provided by CPEs 210 and/or event server 240 may be used to determine correlating data associated with the forecast query. For example, analysis server 250 may determine correlating data by parsing data provided by CPEs 210 and/or event server 240 to identify data that may affect the analytics data associated with the forecast query.

In one example implementation, assume that the forecast query includes an identifier that identifies a cellular phone merchant, a timeframe associated with an upcoming weekend, and a sales activity forecast type. Analysis server 250 may determine correlating data that may affect the analytics data (e.g., historical sales activity) of the merchant, such as event data (e.g., news articles identifying a launch of a new cellular phone type that the merchant may sell), manufacturing data (e.g., manufacturing provided by a CPE 220 associated with a manufacturer) relating to the production of electronic components for a cellular phone that the merchant may sell, social activity data (e.g., social activity data provided by a CPE 220 associated with a social networking provider) relating to cellular phone users' interest in purchasing a new cellular phone that the merchant may sell, etc.

In some implementations, correlating data may be determined based on data provided by CPEs 220 associated with different parties, even when the different parties provide data to analysis server 250 for different purposes.

In some implementations, some data may not be used as correlating data when an owner of the data (e.g., a party associated with a particular CPE 220) does not permit the data to be used as correlating data. For example, analysis server 250 may store permissions policies to identify which sets of data (e.g., data provided by multiple CPEs 220 associated with different parties) may be used as correlating data.

Process 400 may also include correlating the analytics data with the correlating data to form forecast data (block 450). In some implementations, analysis server 250 may correlate the analytics data with the correlating data by determining a factor and applying the factor (e.g., multiply the factor) to the analytics data. For example, analysis server 250 may determine a factor relating to a degree to which the correlating data may affect the analytics data (e.g., historical sales activity data). In some implementations, the factor may be determined based on a measure of popularity and/or a measure of significance of the correlating data. For example, the factor may be proportional to the measure of popularity and/or the measure of significance.

As an example, assume that the analytics data relates to historical sales activity data for a merchant of cellular phones. Analysis server 250 may determine correlating data, such as news articles identifying a launch of a new cellular phone type that the merchant may sell, and may determine a factor based on a measure of popularity of the news articles (e.g., a frequency with which the news articles are accessed). Analysis server 250 may also determine correlating data, such as a quantity of components being manufactured for the new cellular phone type (e.g., as determined by data provided by the CPE 220 associated with a cellular phone components manufacturer). In some implementations, analysis server 250 may determine a factor based on a measure of significance of the correlating data by identifying that part numbers being manufactured by the cellular phone components manufacturer match part numbers associated with a cellular phone that the merchant may sell. In some implementations, analysis server 250 may determine the factor based on multiple sets of data (e.g., based on a set of event data provided by event server 240 and/or based on sets of data provided by any number of CPEs 210).

In some implementations, analysis server 250 may determine the factor without revealing the correlating data to parties not associated with the correlating data. For example, analysis server 250 may determine factor relating to a sales activity forecast for a merchant based on manufacturing data provided by a CPE 210 associated with a manufacturing company without revealing the manufacturing data to the merchant.

In some implementations, analysis server 250 may correlate analytics data with correlating data by multiplying the factor with the analytics data to form forecast data. Alternatively, analysis server 250 may form forecast data using some other algorithm or technique. In some implementations, analysis server 250 may generate a query response (e.g., a response having the forecast data, such as a sales activity forecast) based on forming the forecast data.

Process 400 may also include providing a query response (block 460). For example, analysis server 250 may provide a query response (e.g., a response having the forecast data, such as a sales activity forecast) to client device 210 based on generating the query response and based on authorizing client device 210 to receive the query response. For example, client device 210 may provide authorization information (e.g., a user name and a password) to analysis server 250 such that analysis server 250 may authorize client device 210 to receive the query response. In some implementations, client device 210 may receive the query response and may display the query response in the form of a table, a graph, a chart, or some other format.

While a particular series of blocks have been described above with regards to FIG. 4, the order of the blocks may be modified in other implementations. Further, non-dependent blocks may be performed in parallel.

Figure 5A:
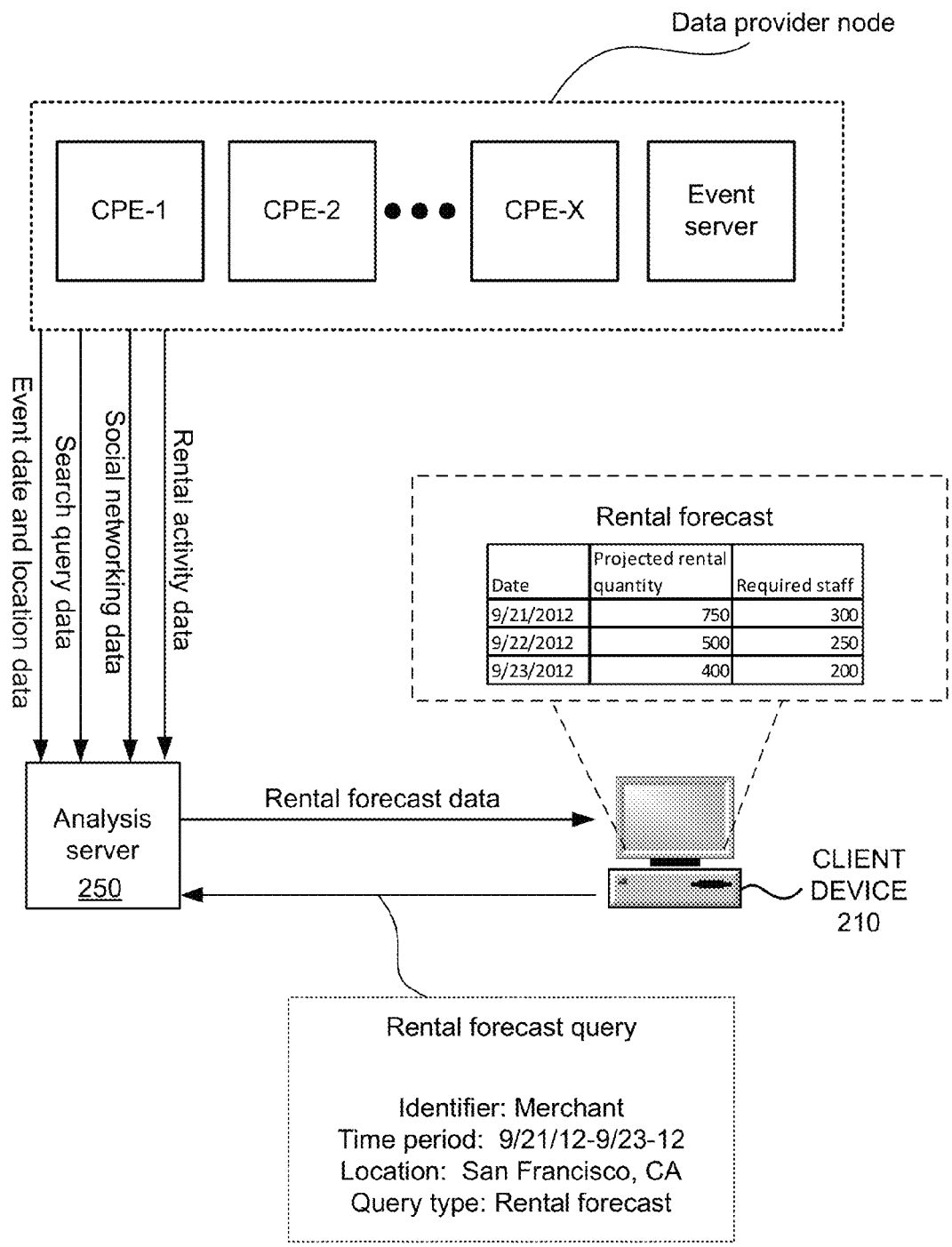
FIGS. 5A-5B illustrate example implementations as described herein.

FIG. 5A illustrates an example implementation as described herein. As shown in FIG. 5A, and as described above, a data provider node may include CPE-1 through CPE-X where each CPE 220 is associated with a different party. In FIG. 5A, assume that CPE-1 is associated with a merchant which provides rental services for automobiles. In some implementations, CPE-1 may generate and store data associated with the merchant (e.g., rental dates, rental durations, types of automobiles rented, etc.). In some implementations, the data provider node may include any number of CPEs 220 to generate and store data associated with any number of other parties.

In some implementations, and as a described above, the data provider node may provide data generated by CPE-1 through CPE-X and event data generated by event server 240 to analysis server 250 (e.g., via ingest server 230). As further shown in FIG. 5A, client device 210 may provide a forecast query having an identifier of the merchant, a forecast timeframe, a geographic location, and a forecast query type (e.g. a rental forecast query) to analysis server 250. Analysis server 250 may receive the forecast query and provide a query response to client device 210 (e.g., in accordance with process 400).

For example, analysis server may determine analytics data (e.g., historical data corresponding to the timeframe and geographic location included in the forecast query) and may determine correlating data based on data received from event server 240 and CPE-1 through CPE-X (e.g., data from CPE-1 through CPE-X that is permitted to be shared and used as correlating data).

In some implementations, analysis server 250 may identify correlating data based on data provided by a CPE 220 associated with a social networking provider. For example, analysis server 250 may identify correlating data, such as publicly available information for subscribers of the social networking provider relating to rental activity for the timeframe and geographic location included in the forecast query. For example, the publically available information may include information to identify that a subscriber of the social networking provider may be traveling during the timeframe included in the forecast query and may be in need of rental automobile services at the geographic location included in the forecast query.

In some implementations, analysis server 250 may identify some other correlating data provided by CPE-1 through CPE-X and event server 240, such as information for an event that may relate to a demand in rental automobile services during the timeframe and at the geographic location included in the forecast query. In some implementations, analysis server 250 may identify correlating data, such as search query information relating to rental activity provided by a particular CPE 220 which stores data relating to search queries (e.g., a CPE 220 associated with a web search provider).

In some implementations, and as described above, analysis server 250 may correlate the analytics data and the correlating data to form a query response having forecast data and may provide the query response to client device 210. In some implementations, client device 210 may display the query response on a display of client device 210. In an example shown in FIG. 5A, the query response may include a rental forecast in the form of a chart having information such as projected rental quantity by data and required staff by date.

Figure 5B:
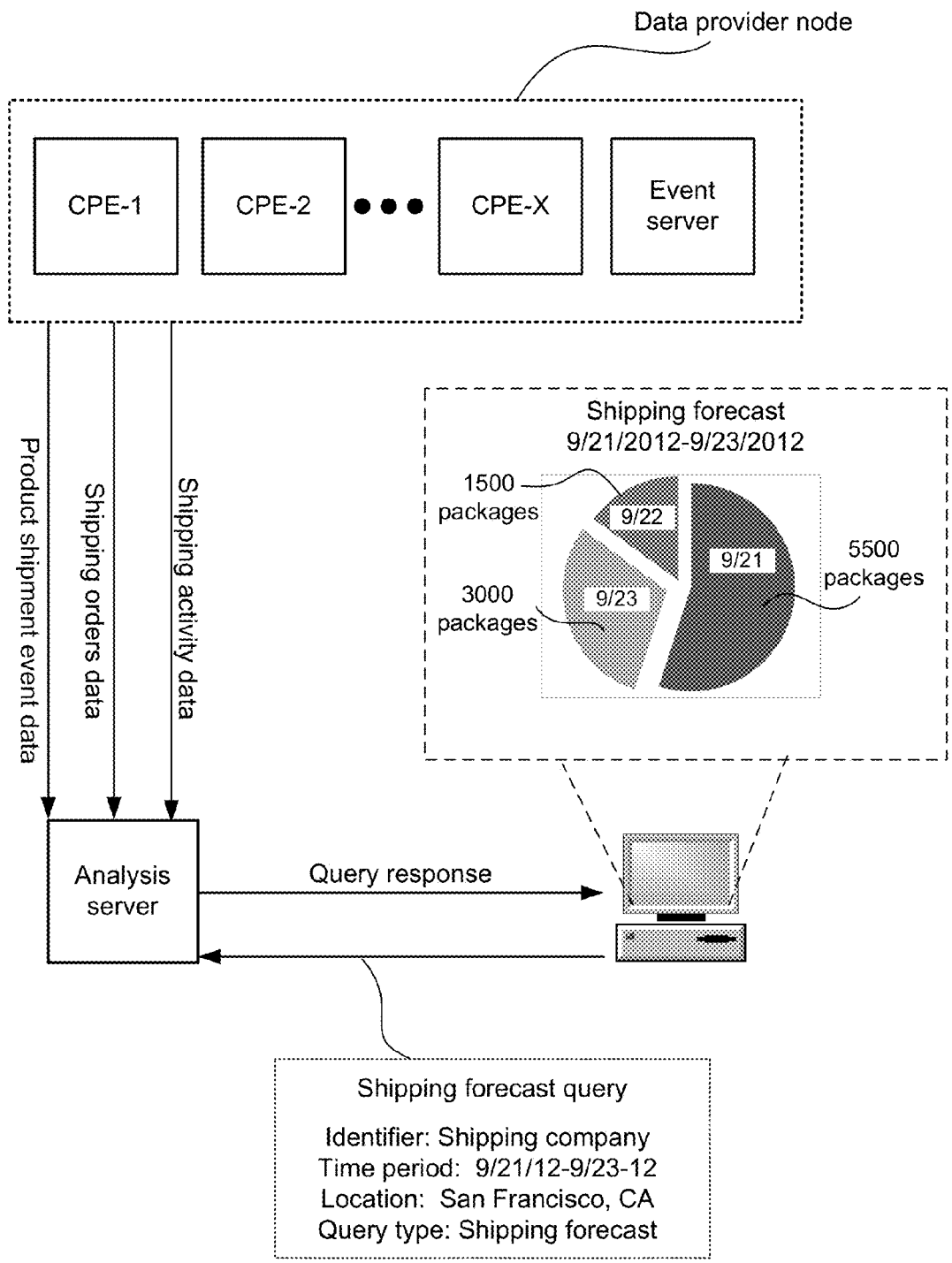

FIG. 5B illustrates an example implementation as described herein. In FIG. 5B, assume that CPE-1 is associated with a product shipping company. In some implementations, CPE-1 may generate and store data associated with the product shipping company (e.g., traffic for shipping routes for a particular area, shipping transactions, etc.)

As further shown in FIG. 5B, client device 210 may provide a forecast query having an identifier of the product shipping company, a forecast timeframe, a geographic location, and a forecast query type (e.g. shipping forecast query) to analysis server 250. Analysis server 250 may receive the forecast query and provide a query response to client device 210 (e.g., in accordance with process 400).

For example, analysis server 250 may generate analytics data (e.g., historical traffic data corresponding to the timeframe and geographic location included in the forecast query) and may determine correlating data based on data received from event server 240 and CPE-1 through CPE-X (e.g., data from CPE-1 through CPE-X that is permitted to be shared and used as correlating data).

In some implementations, analysis server 250 may identify correlating data based on data provided by a CPE 220 associated with a merchant of cellular phones. For example, analysis server 250 may identify correlating data, such as product shipments relating to shipping activity for the timeframe and geographic location included in the forecast query.

In some implementations, analysis server 250 may identify some other correlating data provided by CPE-1 through CPE-X and event server 240, such as information for an event that may relate to a demand in product shipping services (e.g., the launch of a new cellular phone type) during the timeframe and at the geographic location included in the forecast query. In some implementations, analysis server 250 may identify correlating data, such as search query information relating to shipping activity provided by a particular CPE 220 which stores data relating to search queries (e.g., a CPE 220 associated with a web search provider).

In some implementations, and as described above, analysis server 250 may correlate the analytics data and the correlating data (e.g., based on determining the correlating data) to form a query response and may provide the query response to client device 210. In some implementations, client device 210 may display the query response on a display of client device 210. In an example shown in FIG. 5B, the query response may include a shipping forecast in the form of a pie graph having information such as a projected quantity of package deliveries by date. In some implementations, the query response may include a shipping forecast even when shipping orders have not yet been received by the product shipping company. In some implementations, staffing requirements, shipping routes, and/or some other shipping information may be determined based on information provided by the shipping forecast.

While particular examples are shown in FIGS. 5A-5B, it will be apparent that the above description is merely an example implementation. For example, CPE-1 through CPE-X may generate data associated with some other party for some other purpose not described in FIGS. 5A-5B and forecast queries may query for forecasts for some other implementation not described in FIGS. 5A-5B.

As described above, forecasting information may be determined based on event information and based on information provided by multiple CPEs 220 associated with multiple parties, even when the multiple parties are independent of each other and when each CPE 220 generates and/or stores data for different purposes. Further, correlating and forecasting algorithms may be shared among the multiple parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first server, first sets of data from one or more second servers,
   each second server, of the one or more second servers, providing a respective first set of data;
   receiving, by the first server, a query from a client device, the query including an identifier associated with one of the one or more second servers, information identifying a timeframe, and a request for forecast information relating to the timeframe and relating to the first set of data received from the one of the one or more second servers;
   determining, by the first server, a second set of data associated with the one of the one or more second servers associated with the identifier and based on the timeframe,
   the second set of data relating to historical data associated with the timeframe;
   determining, by the first server, subsets of the first sets of data that relate to historical data for the timeframe;

determining, by the first server, the forecast information based on the subsets of the first sets of data and the second set of data; and providing, by the first server and to the client device, a query response including the forecast information as a response to the query.

2. The method of claim 1, further comprising:

receiving, from a third server, a third set of data relating to an event; and determining a subset of the third set of data that relates to the historical data for the timeframe, where determining the forecast information is further based on the subset of the third set of data.

3. The method of claim 1, further comprising:

receiving permissions information from the one or more second servers, the permissions information identifying subsets of the first sets of data that are permitted to be used to determine the forecast information, where determining the subsets of the first sets of data is further based on the permissions information.

4. The method of claim 1, where the query further includes information identifying a geographical location, and where generating the second set of data is further based on the geographical location.

5. The method of claim 1, where each second server, of the one or more second servers, is associated with a respective, different party.

6. The method of claim 1, further comprising:

authorizing the client device to receive the query response, where providing the query response to the client device is based on authorizing the client device.

7. The method of claim 1, further comprising:

generating a factor based on the subsets of the first sets of data, where determining the forecast information is based on multiplying the second set of data by the factor.

8. The method of claim 7, where the factor is generated further based on a measure of popularity associated with the subsets of the first sets of data or a measure of a significance associated with the subsets of the first sets of data.

9. A system comprising:

a first server to:

receive first sets of data from one or more second servers, each second server, of the one or more second servers, providing a first set of data;

receive a query from a client device, the query including an identifier associated with one of the one or more second servers, information identifying a timeframe, information identifying a geographic location, and a request for forecast information relating to the timeframe and the geographic location and relating to the first set of data received from the one of the one or more second servers;

determine a second set of data associated with the one of the one or more second servers associated with the identifier and based on the timeframe and the geographic location, the second set of data relating to historical data associated with the timeframe and the geographic location;

determine subsets of the first sets of data that correspond to the historical data for the timeframe and the geographic location;

determine the forecast information based on the subsets of the first sets of data and the second set of data; and provide, to the client device, a query response including the forecast information as a response to the query.

10. The system of claim 9, where the first server is further to:

receive, from a third server, a third set of data relating to an event; and determine a subset of the third set of data corresponding to the historical data for the timeframe, where, when determining the forecast information, the first server is further to:

determine the forecast information further based on the subset of the third set of data.

11. The system of claim 9, where the first server is further to:

receive permissions information associated with the one or more second servers, the permissions information identifying subsets of the first sets of data that are permitted to be used to determine the forecast information, where, when determining the subsets of the first sets of data, the first server is further to:

determine the subsets of the first sets of data further based on the permissions information.

12. The system of claim 9, where each second server, of the one or more second servers, is associated with a respective, different party.

13. The system of claim 9, where the first server is further to:

authorize the client device to receive the query response, where, when providing the query response to the client device, the first server is further to:

provide the query response to the client device based on authorizing the client device.

14. The system of claim 9, where the first server is further to:

generate a factor based on the subsets of the first sets of data, where, when determining the forecast information, the first server is further to:

determine the forecast information based on multiplying the second set of data by the factor.

15. The system of claim 9, where, when generating the factor, the first server is further to:

generate the factor further based on a measure of popularity or significance of the first sets of data.

16. A non-transitory computer-readable medium storing instructions, the instructions comprising:

one or more instructions which, when executed by one or more processors associated with a first server, cause the one or more processors to:

receive first sets of data from one or more second servers, each second server, of the one or more second servers, providing a first set of data, and each second server, of the one or more second servers, being associated with a different, respective party;

receive a query from a client device, the query including;

an identifier associated with one of the one or more second servers, information identifying a timeframe, and a request for forecast information relating to the timeframe and relating to the first set of data received from the one of the one or more second servers;

determine a second set of data associated with the one of the one or more second servers associated with the identifier and based on the timeframe,
the second set of data relating to historical data associated with the timeframe;
determine subsets of the first sets of data, that correspond to the historical data, for the timeframe;
determine the forecast information based on the subsets of the first sets of data and the second set of data; and
provide, to the client device, a query response including the forecast information as a response to the query.

17. The non-transitory computer-readable medium of claim 16, where the instructions further comprise:
one or more instructions which, when executed by the one or more processors, cause the one or more processors to:
receive, from a third server, a third set of data relating to an event; and
determine a subset of the third set of data corresponding to the historical data for the timeframe,
where one or more instructions to determine the forecast information include:
one or more instructions which, when executed by the one or more processors, cause the one or more processors to:
determine the forecast information further based on the subset of the third set of data.

18. The non-transitory computer-readable medium of claim 16, where the instructions further comprise:
one or more instructions which, when executed by the one or more processors, cause the one or more processors to:
receive permissions information associated with the one or more second servers,
the permissions information identifying subsets of the first sets of data that are permitted to be used to determine the forecast information,
where one or more instructions to determine the subsets of the first sets of data include:
one or more instructions which, when executed by the one or more processors, cause the one or more processors to:
determine the subsets of the first sets of data further based on the permissions information.

19. The non-transitory computer-readable medium of claim 16, where the instructions further comprise:
one or more instructions which, when executed by the one or more processors, cause the one or more processors to:
generate a factor based on the subsets of the first sets of data,
where one or more instructions to determine the forecast information include:
one or more instructions which, when executed by the one or more processors, cause the one or more processors to:
determine the forecast information based on multiplying the second set by the factor.

20. The non-transitory computer-readable medium of claim 19, where one or more instructions to generate the factor include:
one or more instructions which, when executed by the one or more processors, cause the one or more processors to:
generate the factor further based on:
a measure of popularity of the first sets of data, or
a measure of a significance of the first sets of data.

* * * * *